6 Sheets—Sheet 1.

M. A. DALTON.
TIME-LOCKS.

No. 194,896. Patented Sept. 4, 1877.

Attest
F. Petretti
E. D. Grafton

Inventor
Milton A. Dalton
By Geo. Murray
his Attorney

N. PETERS, PHOTO-LITHOGRAPHER, WASHINGTON, D. C.

6 Sheets—Sheet 2.

M. A. DALTON.
TIME-LOCKS.

No. 194,896. Patented Sept. 4, 1877.

Attest
F. Pedretti
E. D. Grafton

Inventor
Milton A. Dalton
By Geo. J. Murray
his Attorney

6 Sheets—Sheet 3.

M. A. DALTON.
TIME-LOCKS.

No. 194,896. Patented Sept. 4, 1877.

Attest
H. Pedretti
E. D. Grafton.

Inventor
Milton A. Dalton
By Geo. J. Murray
his Attorney

6 Sheets—Sheet 4.

M. A. DALTON.
TIME-LOCKS.

No. 194,896. Patented Sept. 4, 1877.

Attest
F. Pedretti
E. D. Grafton

Inventor
Milton A. Dalton
By Geo. J. Murray
his Attorney

6 Sheets—Sheet 5.

M. A. DALTON.
TIME-LOCKS.

No. 194,896. Patented Sept. 4, 1877.

Attest
F. Pedrietti
E. L. Grafton

Inventor
Milton A. Dalton
By Geo. J. Murray
his Attorney

N. PETERS, PHOTO-LITHOGRAPHER, WASHINGTON, D. C.

6 Sheets—Sheet 6.

M. A. DALTON.
TIME-LOCKS.

No. 194,896. Patented Sept. 4, 1877.

UNITED STATES PATENT OFFICE.

MILTON A. DALTON, OF CINCINNATI, OHIO.

IMPROVEMENT IN TIME-LOCKS.

Specification forming part of Letters Patent No. 194,896, dated September 4, 1877; application filed June 30, 1877.

*To all whom it may concern:*

Be it known that I, MILTON A. DALTON, of Cincinnati, in the county of Hamilton and State of Ohio, have invented a new and useful Improvement in Time-Locks, which improvement is fully set forth in the following specification, reference being had to the accompanying drawings.

This invention relates to time-locks for safes. The object of it is to combine with a time-movement and a lock an intermediate connecting-link. This link is to be braced against its adjunct in the time-movement. When the adjunct is at rest the link, coacting with the lock, will assist in setting the tumblers in a position to receive the dogging angle-bar, or a dog to be removed from the bolt, and thus permit the safe to be opened; but when this adjunct is in motion the link will not act conjointly with the lock, and will not then be effective in opening the safe.

The intermediate connecting-link is the first part of the invention.

The second part is the arrangement of devices attached to and acted upon by the time-piece, for the purpose of regulating the times during which the adjunct in the time-piece, which is connected with the link, shall move or remain fixed.

The third part is the devices connected with the lock which act in conjunction with the intermediate device or link to accomplish the desired result.

The fourth part is the means shown of attaching the lock to the safe, whereby it is placed beyond injury when violence is used against the safe or door.

Figure 1:
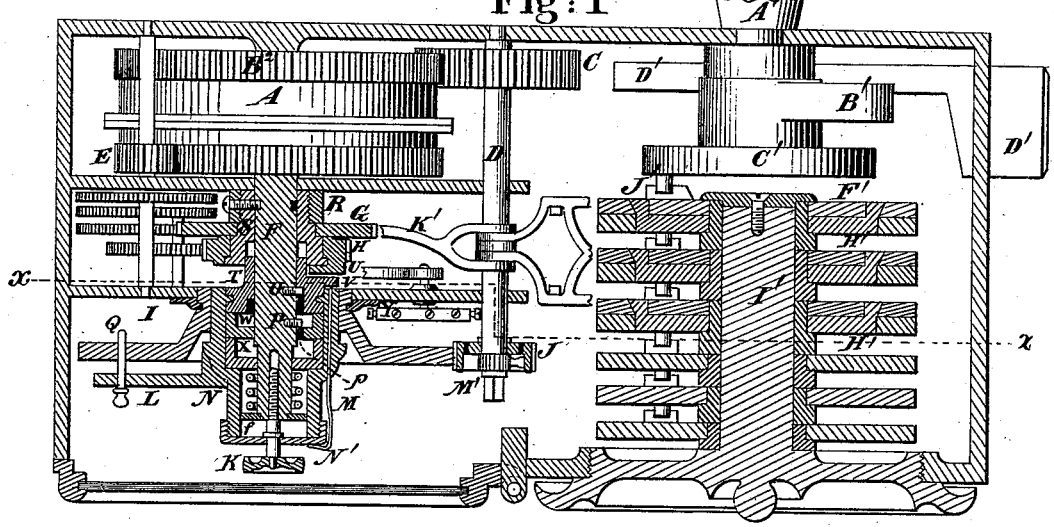
Figure 2:
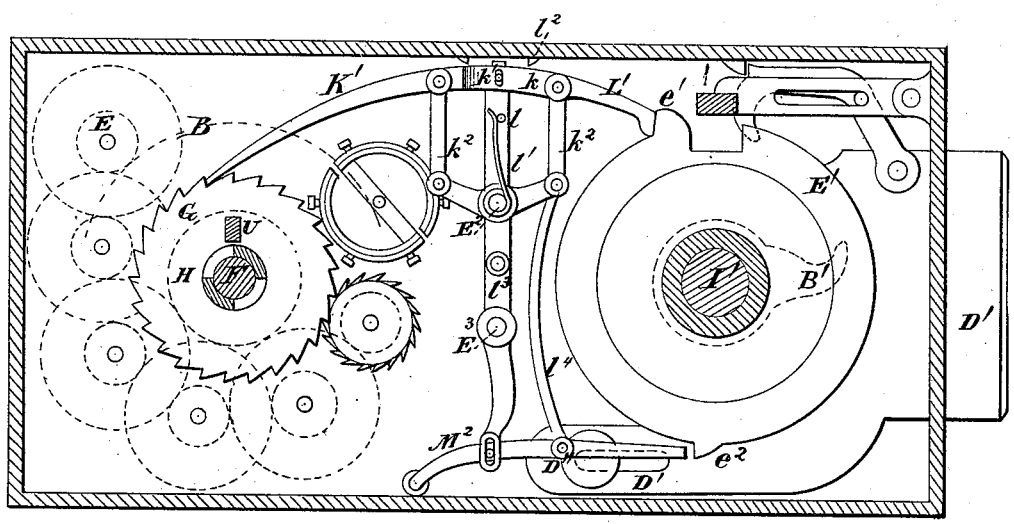
Figure 3:
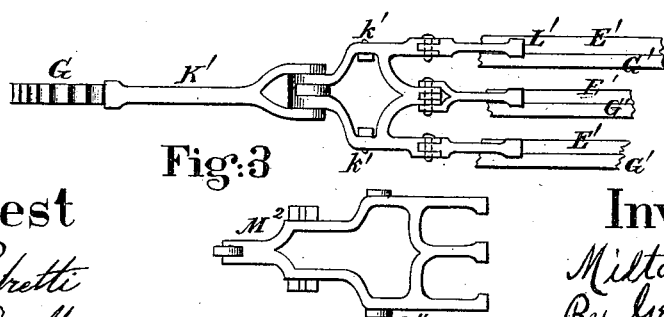
Figure 4:
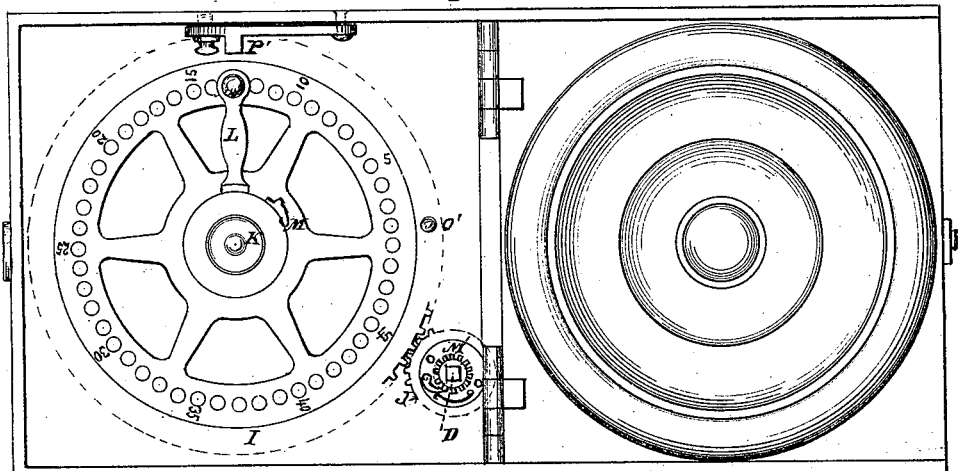
Figure 5:
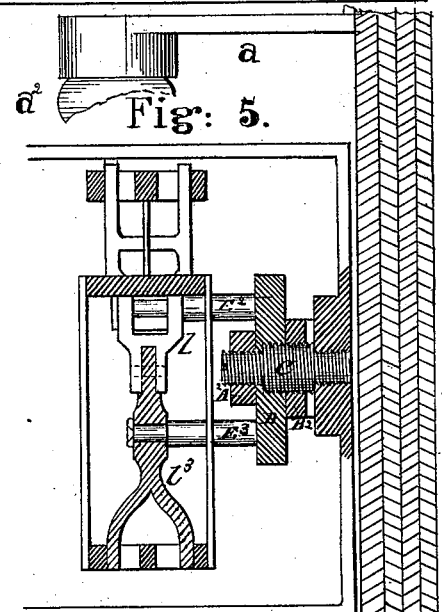

In the drawings, Figure 1 is a top view of the time-lock with the combination-tumblers and the regulating mechanism of the time-piece shown in section. Fig. 2 is a longitudinal section, taken in line $x\,x$, Fig. 1. Fig. 3 is a top plan view of the upper and lower fingers which hold the false tumblers while the combination for opening the safe is being set. Fig. 4 is a front elevation of the lock. Fig. 5 is a vertical transverse section through the intermediate link and its connections, looking in the direction of the time-movement. This Fig. 5 also shows the mode of connecting the lock to the wall or door of the safe.

The remaining figures show modifications of the invention, and will be particularly described hereinafter.

A is the spring-case. It revolves on shaft F, and has upon it two cog-wheels, B and $B^2$. Wheel B drives the pinion E, and through it the clock-work. The clock-work drives pinion H, which revolves upon hub S. Wheel $B^2$ drives pinion C, shaft D, and, through pinion J, which is driven by a ratchet and click on shaft D, the dial mechanism.

F is a stationary shaft. The hub S, collar R, and ratchet G, which, in this instance, constitute the adjunct heretofore mentioned, are permanently connected together, and fitted to revolve upon it, and are held in place by a screw passing through the collar and hub, and projecting into an annular groove in the shaft. The hub T is fitted to slide upon shaft F, and is adjustably connected to hub S by tenons projecting from its inner end, entering corresponding mortises in hub S. The purpose of this arrangement is to couple and uncouple the ratchet G and the clock-movement, through the dial mechanism, by bringing the wing V on hub T in or out of contact with the wing U on the face of pinion H. $o$ is a pin in shaft F, which enters a slot in hub T, and holds it, and the parts connected with it, stationary when the mechanisms are disconnected, as in Fig. 1, but enters the annular groove in the front of the hub, and permits the parts to revolve when the mechanisms are connected. N is a cylindrical shell, fitted over the hub T. At its inner end it has keys passing through it into an annular seat in the hub T. The arm L and cups W and X are permanently connected with the shell N, and the whole operated by the dial, through the pin Q, which passes through the arm and one of the holes in the dial. Upon the outer end of shaft F is secured a projecting cap, $f$. This serves the double purpose of steadying the shell N, and as a bearing for the spiral spring $N^1$, which is compressed between it and the cup X for the purpose of forcing the shell N and the parts connected with it back, so as to connect the mechanisms when the slot $p$ in cup W comes opposite pin P in shaft F. The screw K, which passes through the cap of shell N into shaft F, and has a collar which bears against the inner side of the cap, is for the purpose of withdrawing the shell to uncouple it from the pinion H, so that the ratchet G may remain stationary while the dial mechanism moves. M is a rod, which passes through shell N. It is the guide which, by being pushed in, comes in contact with wing V and stops the hub T with its slot opposite pin $o$, to allow hub T to be drawn forward.

It should be understood that the whole purpose of the time-piece mechanism is to regulate the period during which the ratchet-wheel G shall remain stationary and the period during which it shall revolve, as, while stationary, it furnishes the support to the connecting-link between the time-piece and the lock, and while moving, its teeth, which furnish the support, are continually moving away from the link, thus withdrawing the support necessary to operate the lock.

The combination-lock differs from the ones now in use only in having one or more of its tumblers fitted with additional or false tumblers, which can only be set up by the lock-arbor, with the assistance furnished by the connecting-link between the lock and time mechanism when its ratchet G is at rest.

The parts $F^1$, $G^1$, and $H^1$ form the tumbler proper. The ring $E^1$, with its projections $e^1$ $e^2$, is the false tumbler. The piece $H^1$ is turned with a bevel upon the part of its periphery which receives the ring $E^1$. This ring is slipped to its place, and the piece $G^1$ is turned to the proper size and shrunk onto $H^1$, thus holding ring $E^1$ to its place. The ring $E^1$ is fitted to be carried by the pieces $H^1$ $G^1$ by friction, when not obstructed by the connecting-link, and to let them turn while it is held still. The notches in the false tumblers are in the right position to receive the dogging angle-bar when the projections $e^1$ $e^2$ are against the connecting-link, and the ratchet-wheel G at rest, as in Fig. 2.

The intermediate connecting-link between the adjunct in the time-piece and the false tumblers of the combination-lock consists, in this instance, of the following parts: A pawl, $K^1$, reaching into the time-lock, rests on the teeth of the ratchet G, and is pivoted to a coupling, $k$, which is loosely connected at $k^1$ to the upper arm of lever $l$, fulcrumed on fixed stud $E^2$. The other end of the coupling $k$ terminates in a series of branches, to each of which a pawl, $L^1$, is pivoted, adapted to engage the projections $e^1$ on the corresponding false tumblers $E^1$. These pawls $L^1$ are upheld in the position shown in Fig. 2 by the coupling—that is to say, they cannot descend below that position, but they may be lifted.

The coupling is linked by parallel bars $k^2$ and $k^2$ to fixed arms on stud $E^2$, so that the coupling can move only in parallel lines, and, consequently, any pressure exerted against pawls $L^1$ by the projections $e^1$ on the false tumblers will cause them to gradually move away from said projection until the latter can escape.

The lever $l$ is acted upon by a spring, $l^1$, which tends to throw the lever against the fixed projection $l^2$ on the case, in which position the pawls $L^1$ are ready to act on the false tumblers. The lower arm of lever $l$ is pivoted to the upper arm of lever $l^3$, which is fulcrumed on stud $E^3$. By a slot in the lower arm this lever $l^3$ is connected to a stud on a multiple pawl, $M^2$, adapted to engage the projections $e^2$ on the false tumblers. A link, $l^4$, connects this pawl at $D^2$, also, with one of the fixed arms on stud $E^2$ to maintain its dogging-fingers at the proper elevation. This multiple pawl $M^2$ serves to set and hold the false tumblers in moving the regular tumblers in one direction, while the pawls $L^1$ set and hold the false tumblers when the regular tumblers are moved in the opposite direction, and either the one or the other set of pawls acts as a guard against disengaging the false tumblers by the turning of the regular tumblers, according as the latter are revolved in one direction or the other.

$A^1$, Fig. 5, is a portion of the wall or door of a safe. $a$, of which there are four, (only one is shown in full in the figure,) are brackets secured to it. $a^2$ $a^2$ are spring-washers, of rubber or other suitable material, compressed between the brackets and lock-case, which is held firmly between these and out of contact with the inner wall of the door.

The operation of the device and the mode of setting the time-piece are as follows: The pin Q is withdrawn from the dial, and arm L revolved until the slot $p$ in cup W comes opposite pin P. This pin occupies a definite position known to the operator, and the slot in cup W is placed directly opposite to arm L, or in some definite relation to it, so that the slot can be readily brought opposite to the said pin P by setting arm L. The clock-movement is then started, if not already agoing, and the guide-rod M pushed inward past the path of wing V on hub T, which, in this instance, is assumed to be interlocked with wing U on pinion H. The clock-movement continues to turn hub T until its wing strikes rod M. This brings pin O on shaft F opposite to the slot in hub T. The shell N, together with hub T, is then drawn forward by screw K, and rod M withdrawn. The parts are now in the position shown in Fig. 1. The dial is revolved to the left until the pin $o^1$ on the dial is moved the desired number of hours from the stump $P^1$ at the top of the case. The arm L is now revolved the required number of hours, and connected with the dial by passing pin Q through one of its holes. This determines the time the dial may move and the ratchet-wheel G remain stationary, and hence the lock opened by one knowing the combination. The screw K is now driven back until its collar strikes cap $f$. The pin P, which is now within cup W and opposite to a solid part of the bottom of the same, keeps the shell N and its connected parts in their withdrawn position until the dial brings the slot $p$ in the bottom of the cup opposite pin P, when the spring $N^1$ forces it back, disconnecting hub T from shaft F at the same time, or thereabout, that the wing V on said hub is engaged by wing U on pinion H. The hub T now turns with pinion H, and its prongs are interlocked with hub S. This hub and the ratchet G fixed thereto will also be revolved, and the safe cannot be opened until the pin $o^1$ on the dial comes against the stump $P^1$, Fig. 4, and stops the time-piece, (unless by accident to some of the parts it stops sooner,) when the adjunct, including the ratchet-wheel G, which is the support to the intermediate link, becomes and remains fixed, and the permutation-tumblers may be set and the safe opened.

Figure 6:
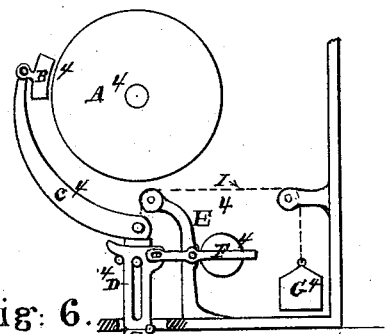
Figure 6:
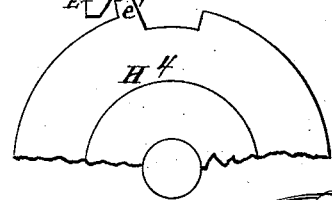

In the modification shown in Fig. 6 the time-piece is located above the permutation-tumblers. $E^4$ is a fixed support secured to the bottom of the case. $F^4$ and $G^4$ are weights to counterbalance the weight of the connecting-link, composed of the parts $B^4$, $C^4$, $D^4$, and $E^5$, to be presently described more in detail.

$A^4$ is a smooth wheel, instead of the ratchet-wheel G shown in the form of the adjunct previously described. $H^4$ is the false tumbler. $C^4$ is an arm with a friction-brake, $B^4$, at its upper end. $D^4$ is a piece secured to arm $C^4$. It has vertical play, guided by pins secured in the case, and has a piece, $E^5$, hinged to its lower end, so as to allow the projection $e^1$ on the false tumbler to pass, when revolved to the right, without moving the parts $D^4$ $C^4$. While the wheel $A^4$ is at rest, if the tumbler $H^4$ is revolved to the left, its projection, striking against the front of piece $E^5$, will turn the link, so as to bring the brake $B^4$ thereof against the wheel $A^4$, and the notch of the tumbler will be held in a position to receive the dogging angle-bar; but when wheel $A^4$ is revolving, if the brake $B^4$ is pressed against it, it will be carried around, and the connecting-link will be drawn up out of contact with the projection on tumbler $H^4$, and allow the tumbler to revolve past it, when, the pressure on the brake being removed, it will drop to the position shown in the figure. The mechanism just described is another form of the adjunct and the intermediate link.

Figure 7:
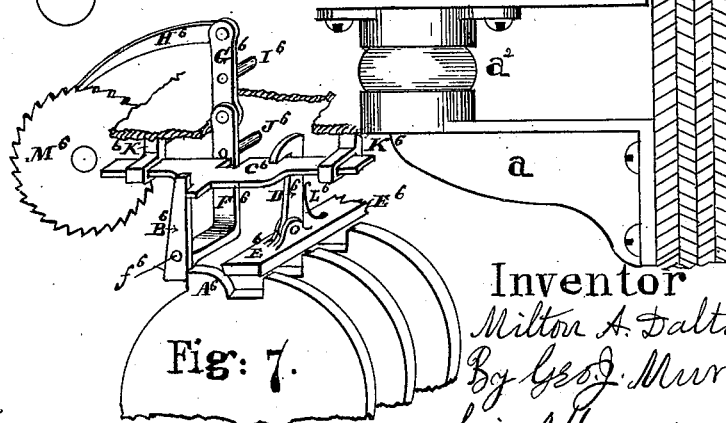

Fig. 7 shows a means of dogging the angle-bar. In this figure $E^6$ is the angle-bar, hung upon a notched piece, $C^6$, which slides in guides $K^6$ $K^6$, secured to the case. The piece $G^6$, which carries the pawl $H^6$, and the angle-piece $F^6$, which carries lever $B^6$, are fulcrumed on pins $I^6$ $J^6$, which are fixed in the case, and are hinged together between the pins. $A^6$ is the projection on the tumbler, and $M^6$ the ratchet-wheel of the time-piece. While this is revolving, if the projection $A^6$ should strike against $B^6$, it will, as the piece $G^6$ is not held stationary by its pawl, turn the piece $F^6$ upon its fulcrum, and carry it back with the lever B, which has its fulcrum in the pin $f^6$, projecting from $F^6$, without moving the piece $C^6$; but, should the ratchet $M^6$ be stationary, the piece $G^6$ will be held rigid, and hold the piece $F^6$ rigid.

Should the tumbler now be revolved, the projection $A^6$ would turn the lever $B^6$ on its fulcrum $f^6$, and slide the piece $C^6$ until its notch is brought under $D^6$, the supporting-link of the angle-bar, and allow the bar to fall into the notches. The hook $D^6$ rests against a spring, L, which permits it to swing back to engage the bar $C^6$ when the angle-bar is lifted.

Figure 8:
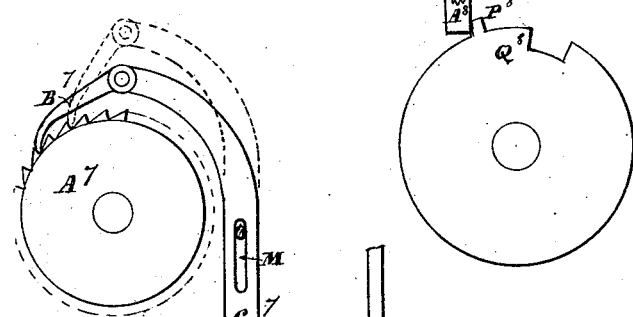
Figure 8:
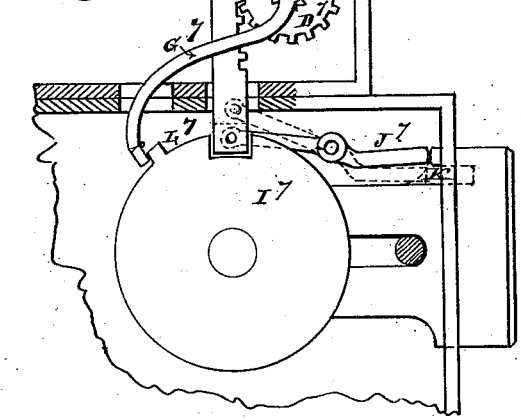

In the modifications shown in Figs. 8 to 17, false tumblers are dispensed with, and in all of them the connecting-link is composed of the parts intermediate between the adjunct or ratchet-wheel in the time-piece, and a tumbler or other operative part of the combination-lock, the same as in the preceding figures. In Fig. 8, $A^7$ represents the ratchet-wheel of the adjunct in the time-lock. $I^7$ is one of the tumblers, or the driving-wheel of the combination-lock. The connecting-link is composed of the pawl $B^7$, rack-bar $C^7$, pinion $D^7$, arm $G^7$, and the connections between arm $G^7$ and the pinion and rack-bar presently to be described. In the position the parts occupy in the figure, the lock could not be opened, as the dogging-arm $J^7$, which turns on a pin in the case, is secured to the bar $C^7$, and when bar $C^7$ is in this position, and $J^7$ has its opposite end brought against the bolt, in order to open the lock it is necessary that the bar $C^7$ be brought to and retained in the position shown in dotted lines. The means of accomplishing this, when the ratchet $A^7$ of the adjunct is at rest, are the rack on bar $C^7$ and the pinion $D^7$, operated by the ratchet and pawl $E^7$ $F^7$ and arm $G^7$, through the projection $L^7$ on the tumbler $I^7$.

The ratchet $E^7$ is secured to pinion $D^7$, and arm $G^7$, which carries the pawl $F^7$, vibrates upon the same shaft. Each time the arm $G^7$ is thrown back by the projection on the tumbler the ratchet $E^7$ and pinion $D^7$ are turned by the pawl $F^7$, and the bar $C^7$ of the link is elevated; and if the ratchet $A^7$ is stationary the pawl $B^7$ will retain the bars $C^7$ in position while the arm $G^7$ swings back, and its pawl takes a new bite in ratchet $E^7$. The bar $C^7$ is arranged in the rear of the tumblers, and does not interfere with their rotation.

When the bar $C^7$ is elevated to the position shown in dotted lines, the combination can be set and the safe opened. It is evident that if the ratchet $A^7$ is revolving it will let the link drop before the combination can be set. The projection $H^7$, extending from the rear end of pawl $F^7$, and entering between the teeth of the rack, will prevent the bar $C^7$ from falling to the position shown in dotted line if the safe were turned over. The end of arm $G^7$ is hinged so as not to obstruct the tumbler when turned in the opposite direction.

Figure 9:
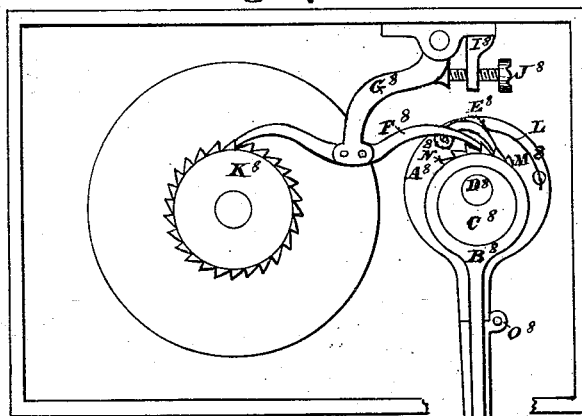

In Fig. 9 the double pawl $F^8$ of the connecting-link swings on arm $G^8$ from the top of the case. $I^8$ is a stud, and $J^8$ a set-screw, to stop the arm $G^8$ and keep the double pawl $F^8$ in its proper position. $C^8$ is a wheel keyed eccentrically upon shaft $D^8$, and $B^8$ a yoke, which has a vertical motion as the cam $C^8$ is revolved. To the lower end of this yoke (shown broken away) is to be connected the dog or dogging angle-bar. $M^8$ and $N^8$ are two ratchet-wheels keyed on shaft $D^8$. $A^8$, which carries pawl $E^8$, is a lever-arm, journaled loosely upon the same shaft. $K^8$ is the ratchet-wheel of the time-piece, and $Q^8$ the tumbler, with a projection, $P^8$, for operating the ratchet $M^8$ through arm $A^8$ and its pawl $E^8$. The arm $A^8$ is composed of two parts, hinged together at $o^8$. When ratchet $M^8$ is revolved the double pawl $F^8$ will, if held by the ratchet $K^8$, restrain it from moving back with its pawl. This operation is continued until shaft $D^8$ is turned half a revolution. This elevates the yoke and permits the safe to be opened. While ratchet K is revolving this cannot be accomplished because the shaft $D^8$ and yoke $B^8$ can then always return to the lowest position by gravity.

Figure 10:
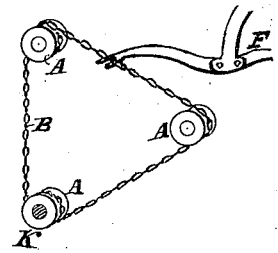

Fig. 10 shows a modification, in which a chain and sprocket wheel takes the place of the ratchet-wheel of the adjunct in the time-piece.

Figure 13:
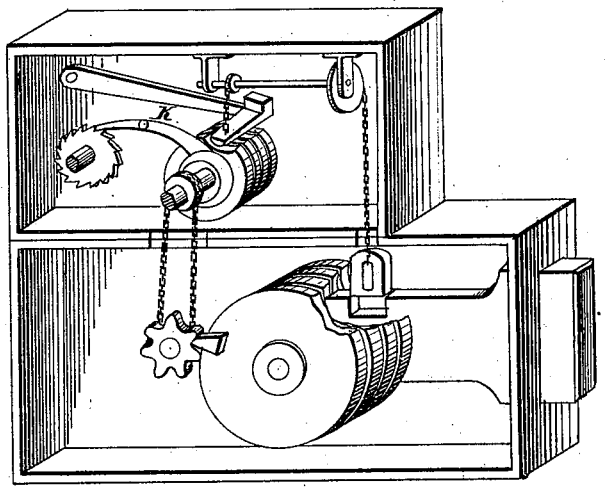
Figure 11:
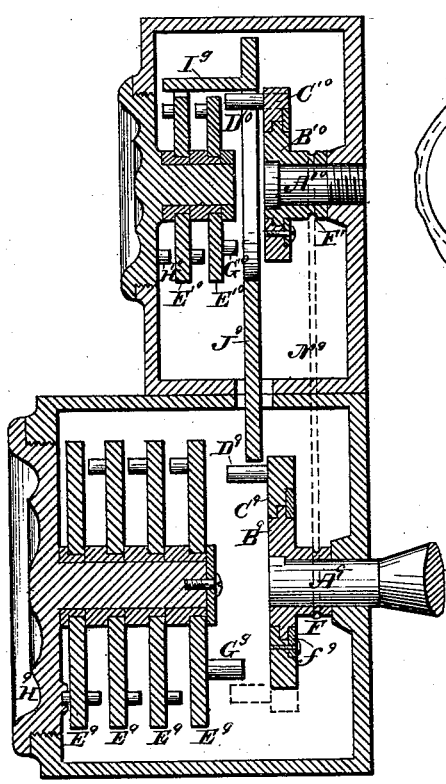
Figure 12:
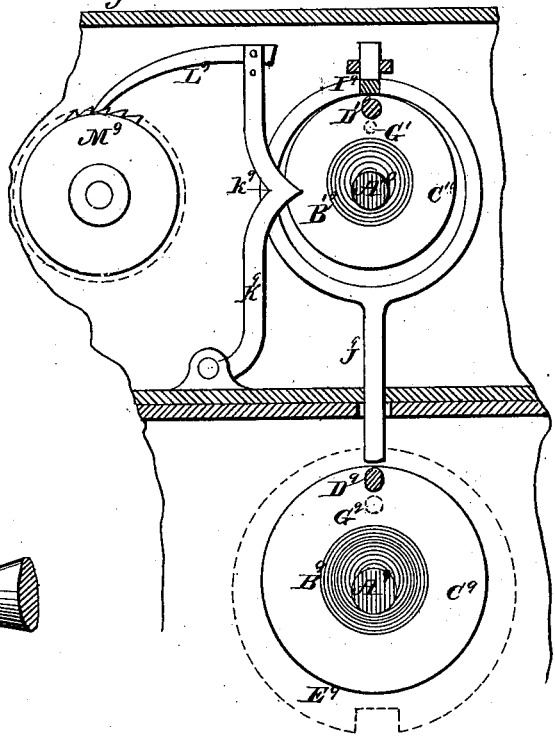

In the forms shown in Figs. 11, 12, and 13 the connecting-link is controlled not only by its adjunct or support in the time-piece, but in addition thereto by a set of permutation-tumblers, which so guard it, after the support in the time-piece becomes stationary, that it cannot act on any part of the lock for unlocking purposes until these permutation-tumblers have been set up.

In Figs. 11 and 12, which are transverse sectional views of the same lock, $A^9$ is the arbor of the combination-lock. Eccentrically keyed to this is the wheel $B^9$, which has a rib projecting from its periphery. $C^9$ is a ring fitted on wheel $B^9$. It has two rabbets turned into its inner circumference. Into the inner of these the rib-projection on wheel $B^9$ enters. The wheel and ring are held together by a washer, $f^9$, which drops into the outer rabbet and holds the parts together with sufficient friction to enable the ring to remain stationary in its seat in the operation of setting the tumblers of the combination-lock. $D^9$ is a pin projecting from the face of ring $C^9$, which engages with pin $G^9$ when in the proper position, and drives the tumblers. In the drawing the pin $D^9$ is shown at its greatest distance from the center of arbor $A^9$, and while in this position it will pass the pin $G^9$, but if the ring $C^9$ is held still while the arbor is turned half a revolution, the pin $D^9$ is brought to its shortest distance from the arbor. It will then be in the position to strike $G^9$ and operate the tumblers.

The upper set of tumblers, which are provided to guard the connecting-link and their driving-wheel, are precisely the same as the tumblers of the combination-lock, except that the driver revolves upon pin $A^{10}$, and is driven by a chain passing over the sprocket-hubs of $B^9$ and $B^{10}$. $K^9$ is an arm, and $L^9$ a pawl of the connecting-link, and $M^9$ the ratchet or adjunct of the time-piece. $I^9$ is the angle-bar of the upper permutation-tumblers. It has a piece, $J^9$, secured to it, which has a circular opening, to permit the pin $D^{10}$ to be carried around within it, and an arm extending down into the lower case.

When the ratchet-wheel $M^9$ is stationary, if the arbor $A^9$ is revolved, it will, through chain $N^9$, revolve the driving-wheel $B^{10}$, and pin $D^{10}$, striking against projection $k^9$ on arm $K^9$, will hold ring $C^{10}$ while $B^{10}$ is turned half a revolution. This carries pin $D^{10}$ inward until it passes the point $k^9$ of $K^9$, and is in a position to engage with pin $G^{10}$ on tumbler $E^{10}$, when the combination of the upper tumblers may be set up, the ring $C^{10}$ being held sufficiently tight in its seat by friction. When this combination is set, the angle-piece $I^9$ drops into the notches of tumblers $E^{10}$, and piece $J^9$ drops to a position to stop-pin $D^9$ of the lower driver until, by revolving $B^9$, it is brought to a position to engage pin $G^9$, when the lower tumblers $E^9$ can be set, and the safe opened. The driving-wheel and tumblers are disconnected by revolving the arbor half a revolution after a pin in the back tumbler strikes a stationary projection, $H^9$.

In Fig. 13 the upper set of tumblers and their driver are constructed and arranged like the ones just described, Figs. 11 and 12, and are operated in the same way, through a sprocket and chain, by a projection on the lower tumbler. In this form the upper combination, when set, removes a dog from the bolt. In these forms, Figs. 11, 12, and 13, as there are two sets of combination-tumblers, if desirable, the presence of two persons may be made necessary to open the safe.

Figure 14:
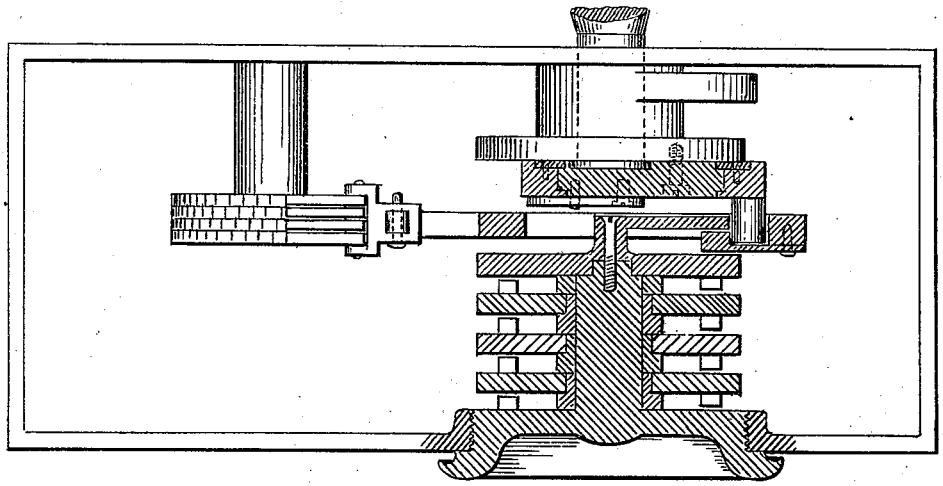
Figure 15:
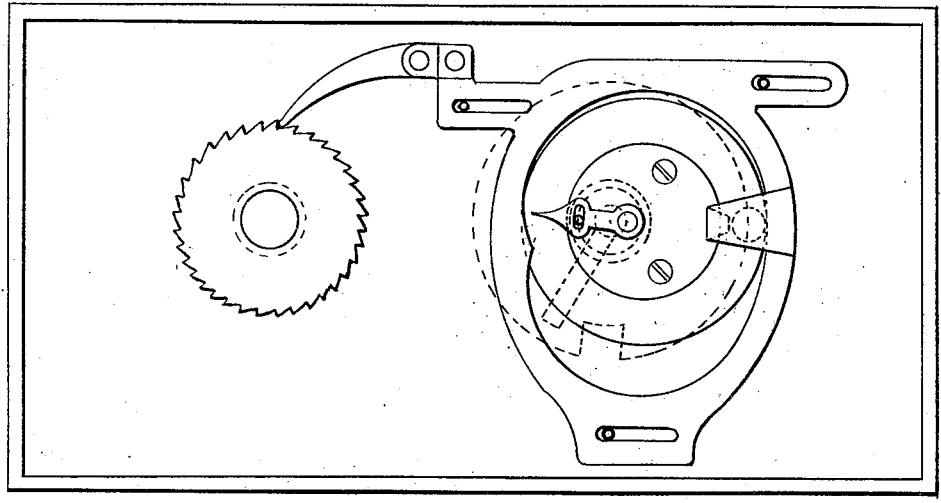

Fig. 14 is a horizontal section, and Fig. 15 a plan view, of another modification. In this form the driving-wheel, to set the tumblers, is constructed substantially the same as in Figs. 11, 12, and 13, and the operation of connecting and disconnecting the driving-wheel and tumblers is the same. The connecting-link is an oval yoke, which slides on pins fixed in the case, and carries a pawl to engage the ratchet-wheel or adjunct in the time-lock. The tumblers are driven by a crank-arm, which is long enough to be operated by the pin in the driving-wheel when said pin is at its nearest point to the center of revolution; but the pin will pass the arm when at its farthest point from the center of revolution. When the ratchet of the time-piece is in motion the link will be carried back and forth by the driving-pin. When the ratchet is held still the yoke becomes fixed, and causes the pin to move inward to a position to operate on the crank-arm of the tumblers. The stump projecting inward from the yoke is for the purpose of bringing the driving-pin into the same known position when the tumblers are to be operated.

Figure 16:
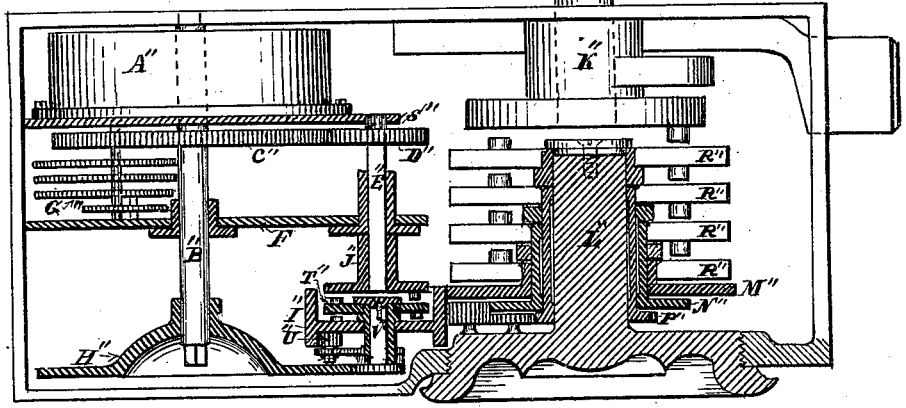
Figure 17:
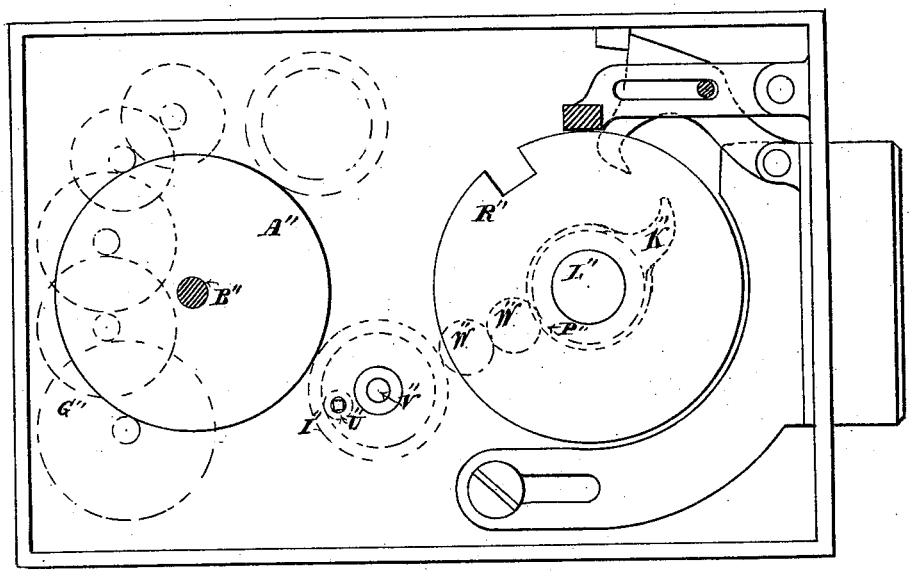

Fig. 16 is a sectional plan, and Fig. 17 an elevation, of a form in which the connection between the time-piece and the lock is a shaft, $E^{11}$, operated by the time-piece through pinion $D^{11}$. $J^{11}$ is the driving-wheel, which is secured on shaft $E^{11}$. $T^{11}$ is a similar wheel, and $I^{11}$ a cog-wheel, both journaled on stud-pin $V^{11}$. $M^{11}$, $N^{11}$, and $P^{11}$ are cog-wheels, sleeved over each other and shaft $L^{11}$, around which they revolve. Each of these sleeves or hubs carries a tumbler, $R^{11}$, which fits it sufficiently close to be carried by it when it revolves, and yet allow the tumbler to slip around upon it when the hub is stationary. The wheel $M^{11}$ is revolved by cog-wheel $I^{11}$, $N^{11}$ is revolved in the opposite direction by an intermediate cog-wheel, and $P^{11}$ in the same direction as $M^{11}$ by a second intermediate cog-wheel.

The operation of this form of lock is as follows: As driving-wheel $J^{11}$ revolves it will, when its pin reaches the pin in wheel $T^{11}$, revolve it. After this has revolved the proper distance it will strike the pin in $I^{11}$. The tumblers $R^{11}$ of the combination-lock will now be set in motion, and the combination for opening the lock cannot be set by its arbor so long as the time-piece runs, for if the notch in one of the tumblers should be brought to the proper position under the angle-bar, and the tumbler released to set the next, the first will be carried out of position by the cog-wheel on whose hub it is seated, and which is being revolved by the time-piece.

The distance the pins in the wheels $J^{11}$, $T^{11}$, and $I^{11}$ are set apart determines the time the clock will run without revolving the tumblers.

Some of the metal is cut away from the inner circumference of hubs $M^{11}$ and $N^{11}$, so as to leave the bearings at the ends, and lessen friction.

These figures, 16 and 17, illustrate an example where the adjunct is directly connected to the time-piece. The adjunct here is composed of the pinion $D^{11}$, the shaft $E^2$, and the driving-wheel $J^{11}$, while the intermediate link begins with wheel $T^{11}$, and ends with the sleeves of the cog-wheels $M^{11}$, $N^{11}$, and $P^{11}$.

It will be observed that in all the forms of the invention where false tumblers are combined with the regular tumblers of the non-time lock, the act of setting the regular tumblers will also set the false tumblers, provided the time-movement stands still; also, that in all the forms of the invention shown the person or persons in charge of the safe must go through precisely the same manipulations, and no other, to open it, no matter whether the time-lock stopped at or before the appointed hour, and that this manipulation is the same as would be required to open the non-time lock irrespective of the pressure or absence of the time-lock.

I claim—

1. The combination of a time-piece, the adjunct connected and operating therewith, the non-time lock, and an intermediate link or mechanism between the adjunct and an operative part of the non-time lock, to assist in setting the combination of the lock when the adjunct in the time-piece is fixed, and to remain inoperative when said adjunct is moving, substantially as specified.

2. The combination, substantially as specified, of the fixed shaft, the hub S loose thereon, and carrying the fixed ratchet G and loose pinion H, provided with a wing, U, and the winged hub T V, which is permanently interlocked with hub S, and is adapted to slide on the fixed shaft, to be engaged alternately by the said shaft and by the said pinion.

3. The combination, substantially as specified, of the interlocked hubs S and T, seated on a fixed shaft, shell N for moving hub T, to lock it to and unlock it from said shaft, and the pin Q and dial I for determining the hour of unlocking hub T from the shaft, and throwing it into gear with the time-movement.

4. The combination, substantially as specified, of a regular tumbler of a non-time lock, a false tumbler adapted to be revolved thereby, a time-piece, the adjunct connected and operating with said time-piece, and an intermediate link or mechanism between the adjunct and the false tumbler, for acting on the false tumbler, to aid the regular tumbler in setting it at any time after the time-piece stops.

5. The brackets $a$, with the spring-washers $a^2$ interposed between them and the lock-case, for the purpose of securing, and at the same time cushioning, the lock-case in its place, substantially as specified.

MILTON A. DALTON.

Witnesses:
JAMES MOORE,
GEO. J. MURRAY.